United States Patent
Wang

(10) Patent No.: US 11,415,737 B2
(45) Date of Patent: Aug. 16, 2022

(54) COVER FOR GLASS LIGHT GUIDE PLATE

(71) Applicant: Tiejun Wang, Lin'an (CN)

(72) Inventor: Tiejun Wang, Lin'an (CN)

( * ) Notice: Subject to any disclaimer, the term of this patent is extended or adjusted under 35 U.S.C. 154(b) by 0 days.

(21) Appl. No.: 17/141,316

(22) Filed: Jan. 5, 2021

(65) Prior Publication Data

US 2022/0214491 A1 Jul. 7, 2022

(51) Int. Cl.
*F21V 8/00* (2006.01)
*F21S 8/02* (2006.01)

(52) U.S. Cl.
CPC ............ *G02B 6/0051* (2013.01); *F21S 8/026* (2013.01)

(58) Field of Classification Search
CPC ................................ G02B 6/0051; F21S 8/026
See application file for complete search history.

(56) References Cited

U.S. PATENT DOCUMENTS

| | | | | |
|---|---|---|---|---|
| 10,190,738 B1* | 1/2019 | James | ................... | F21V 17/107 |
| 2005/0078474 A1* | 4/2005 | Whitfield | ................ | B05B 12/20 |
| | | | | 362/147 |
| 2007/0183154 A1* | 8/2007 | Robson | ................. | F21V 17/164 |
| | | | | 362/267 |
| 2007/0274081 A1* | 11/2007 | Engel | .................... | F21V 7/0016 |
| | | | | 362/346 |
| 2014/0071679 A1* | 3/2014 | Booth | ..................... | F21S 8/026 |
| | | | | 362/249.02 |
| 2014/0111984 A1* | 4/2014 | Rodgers | .................... | F21V 5/04 |
| | | | | 362/231 |
| 2015/0085486 A1* | 3/2015 | Ishida | ................... | F21V 23/006 |
| | | | | 362/249.01 |
| 2019/0301727 A1* | 10/2019 | Sieczkowski | .......... | H04R 1/023 |
| 2020/0340635 A1* | 10/2020 | Boulanger | ............. | H05B 45/37 |
| 2021/0080640 A1* | 3/2021 | Yeo | ...................... | G02B 6/0055 |

\* cited by examiner

*Primary Examiner* — Bryon T Gyllstrom
*Assistant Examiner* — Christopher E Dunay
(74) *Attorney, Agent, or Firm* — Daniel M. Cohn; Howard M. Cohn

(57) ABSTRACT

A light cover for mounting to a downlight trim installed on a ceiling. A light guide plate is mounted to the downlight trim. The downlight trim has an opening therethrough through which the light guide plate extends. The downlight trim projects outward from the light guide plate so that a diffusion plate of the light guide plate extends outward from the downlight trim. The light cover has a circular opening therethrough through which the diffusion plate of the light guide plate extends so as to light up the light cover. The light cover has a collar which extends from an outer front facing surface of the light cover towards the rear facing surface of the light cover.

12 Claims, 4 Drawing Sheets

COVER FOR GLASS LIGHT GUIDE PLATE

TECHNICAL FIELD

The present invention relates to the field of display technologies, and in particular, to a cover for a glass light guide plate.

BACKGROUND OF THE INVENTION

In the display field, the role of the glass light guide plate disposed in a display panel is to guide the scattering direction of a light being shone on the glass light guide plate, to improve the brightness of the display panel, and to ensure the brightness uniformity of the display panel. It is desirable to prevent the light being shone on the glass light guide plate from being continuously reflected inside the glass light guide plate.

SUMMARY OF THE INVENTION

According to the present invention, there is disclosed a light cover for mounting to a downlight trim installed on a ceiling. A light guide plate is mounted to the downlight trim. The downlight trim has an opening therethrough through which the light guide plate extends. The downlight trim projects outward from the light guide plate so that a diffusion plate of the light guide plate extends outward from the downlight trim. The light cover has a circular opening therethrough through which the diffusion plate of the light guide plate extends so as to light up the light cover. The light cover has a collar which extends from an outer front facing surface of the light cover towards the rear facing surface of the light cover.

Further according to the present invention, there is disclosed a light cover for mounting to a downlight trim installed on a ceiling. A light guide plate is mounted to the downlight trim. The downlight trim has an opening therethrough through which the light guide plate extends. The downlight trim projects outward from the light guide plate so that a diffusion plate of the light guide plate extends outward from the downlight trim. The light cover has a circular opening therethrough through which the diffusion plate of the light guide plate extends so as to light up the light cover. The light cover has a collar forms a circular rear facing opening which extends from an outer front facing surface of the light cover towards the back of the light cover and which has a slightly larger diameter than the downlight trim.

BRIEF DESCRIPTION OF THE DRAWINGS

The structure, operation, and advantages of the present invention will become further apparent upon consideration of the following description taken in conjunction with the accompanying figures (Figs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

Figure 1:
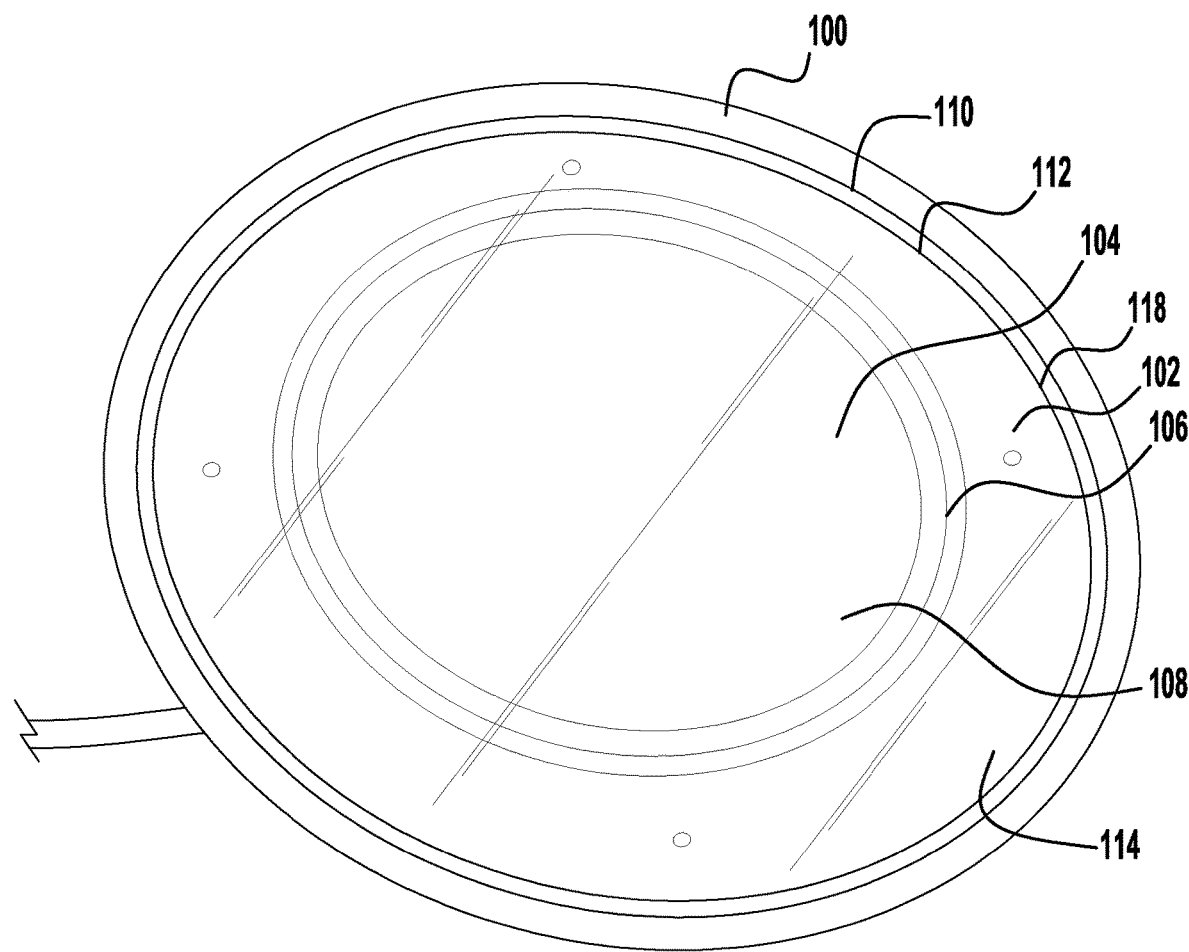
FIG. 1 is a top view of a cover mounted to a light guide plate, in accordance with the present invention.
Figure 2:
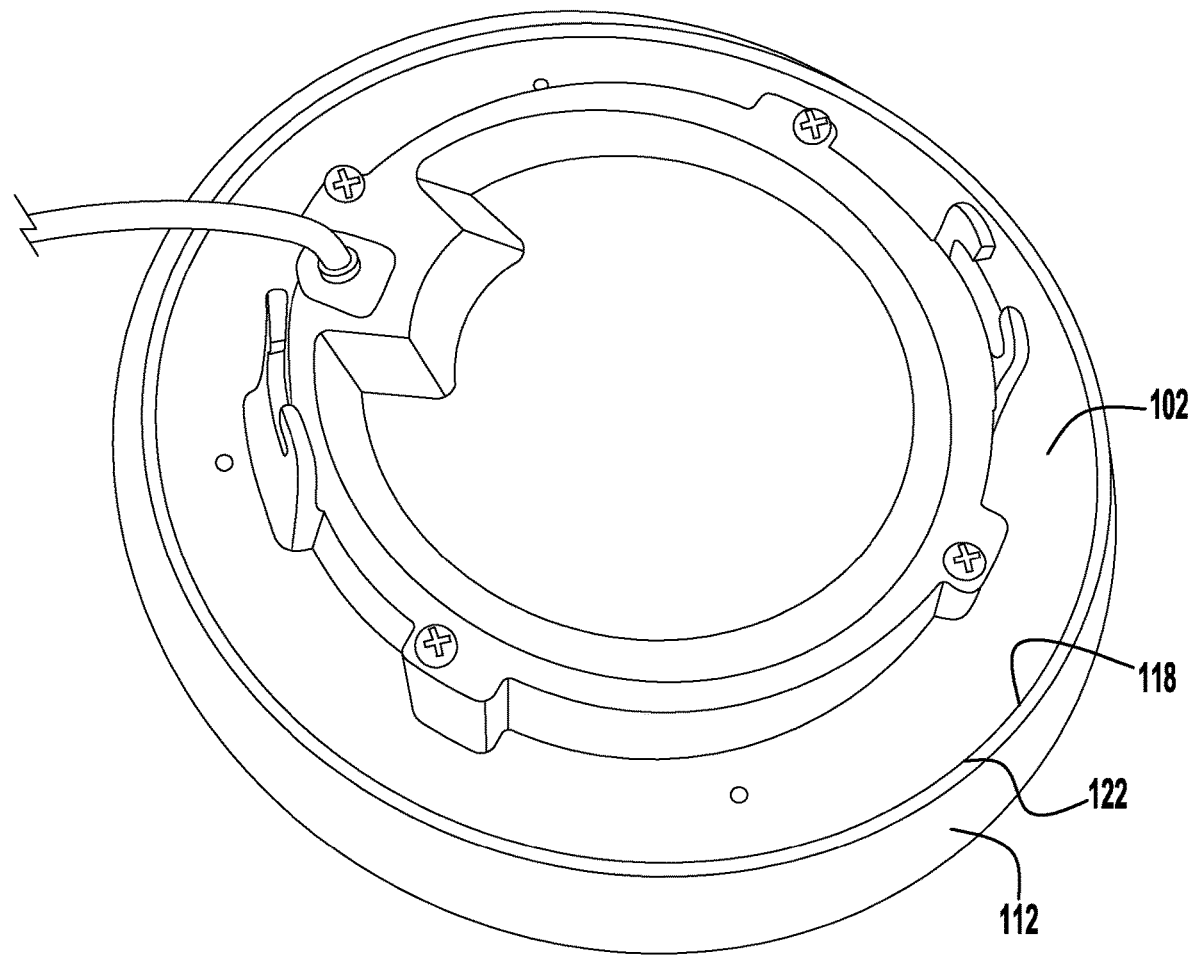
FIG. 2 is a rear view of a light cover mounted to a light guide plate, in accordance with the present invention.
Figure 3:
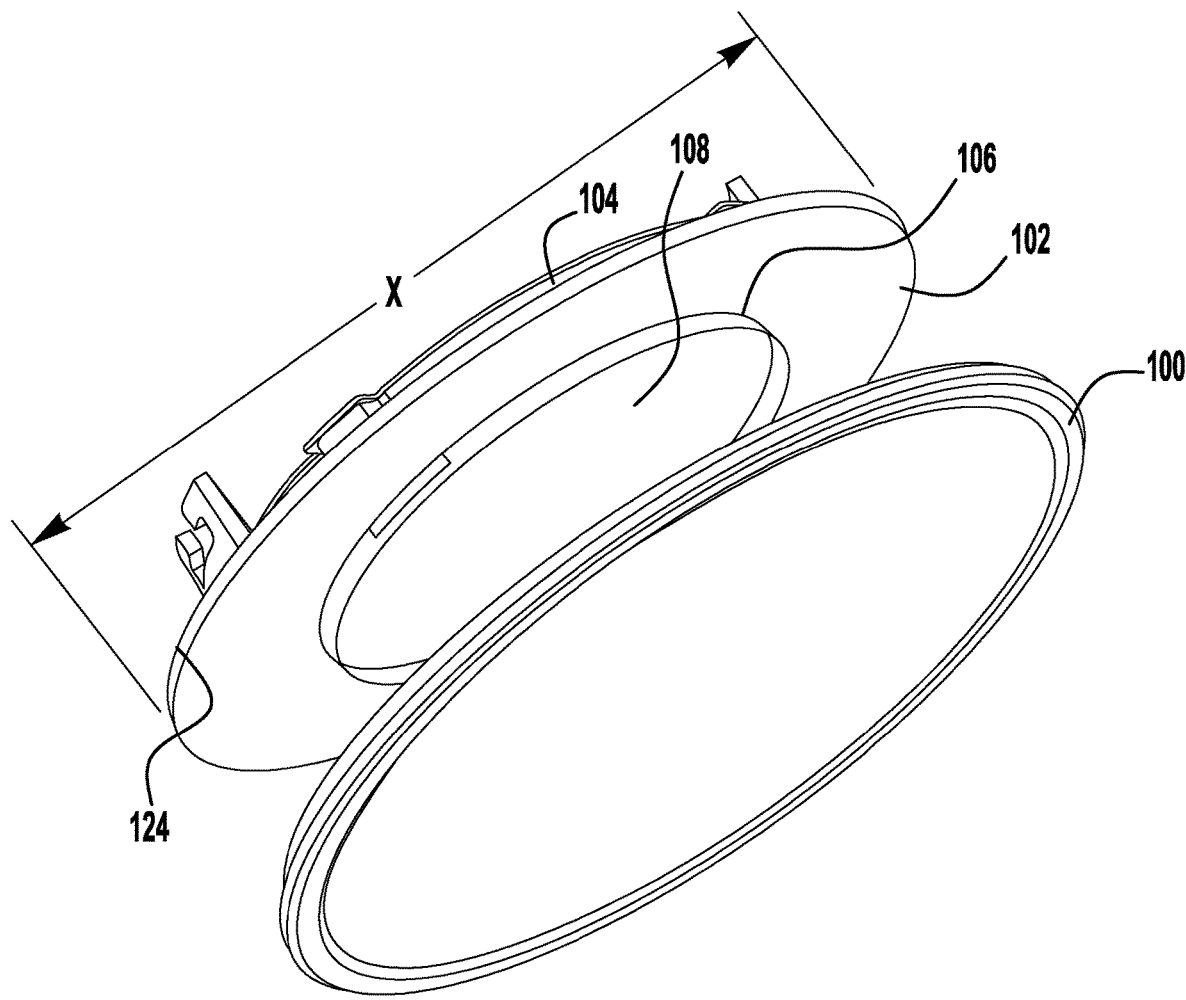
FIG. 3 is an exploded view of a light cover and a light guide plate, in accordance with the present invention.
Figure 4:
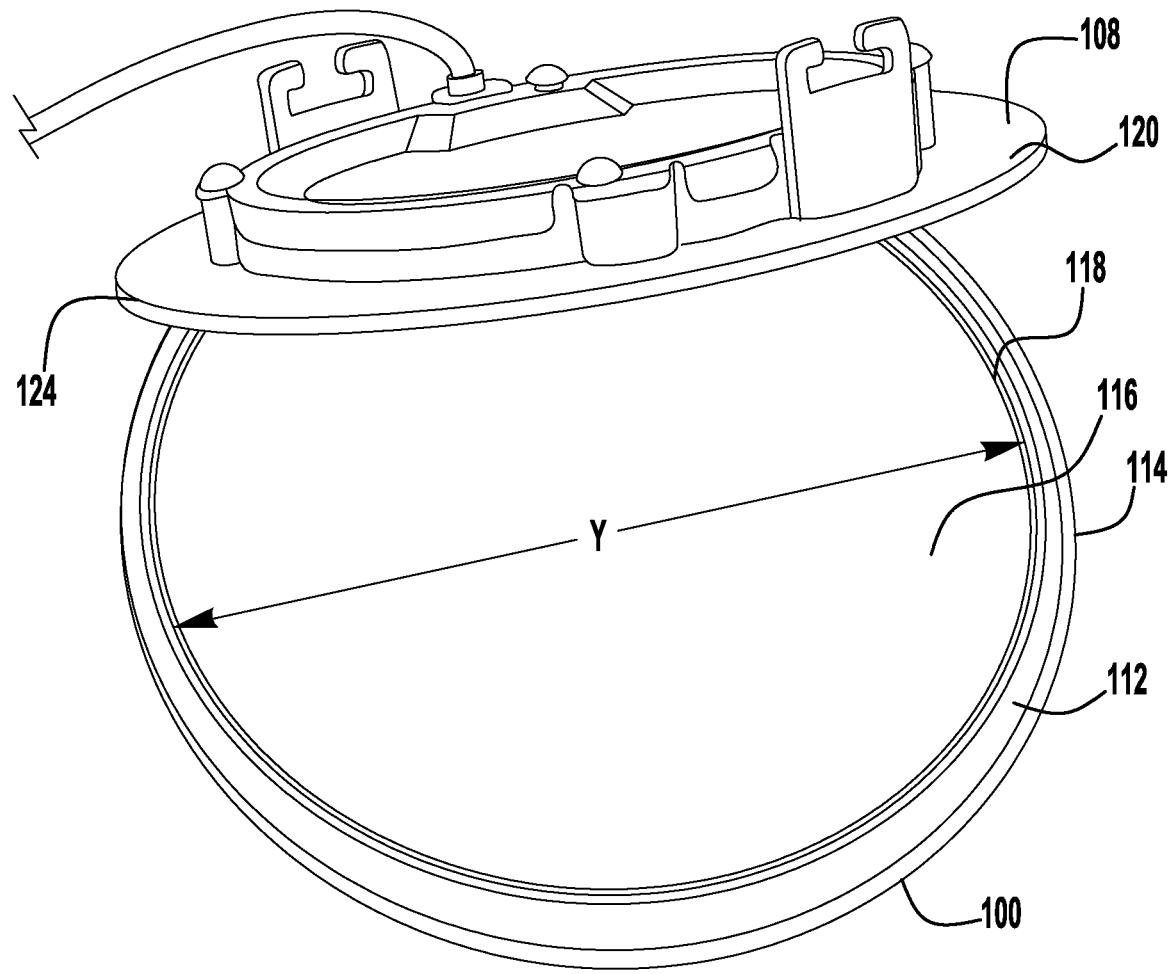
FIG. 4 is a three-dimensional view of a light guide plate being pressed onto a light cover, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader and should not in any way be interpreted as limiting.

Referring to FIG. 1, there is shown a top view of a light cover 100 mounted to a downlight trim 102 which in turn is mounted to a light guide plate 104. The downlight trim 102 has an opening 106 through which the diffusion plate 108 of the light guide plate 104 extends. The downlight trim 102 is disposed on or against a ceiling and projects outward from the light guide plate 104 so that the diffusion plate 108 of the light guide plate 304 extends outward from the downlight trim.

Referring to FIG. 1, a light cover 100 is mounted to the downlight trim 102. The light cover 100 has a circular opening 110 through which the light guide plate 108 extends so as to be able to light up the light cover 100. The light cover 100 has a collar 112 and extends from the outer front facing surface 114 towards the rear facing surface 116 of the light cover. The collar 112 forms a circular, rear facing opening 118 which has a slightly smaller diameter than the outer diameter of the downlight trim 102. For example, the circular rear facing opening 118 has an outer diameter Y while the circular rear facing opening of the downlight trim 102 has an outer diameter X. This difference causes an interference fit between the circular rear facing opening 118 of the light cover 100 and the outer diameter of the downlight trim 102. Between the collar 112 and the circular rear facing opening 118 is a curved inner surface 122 which extends around the interior of the light cover 100. The downlight trim 102 is constructed of a somewhat flexible material that holds its shape such as a polycarbonate or plastic material. The light cover 100 is mounted to the downlight trim 102 by pressing the circular rear facing opening 118 of the light cover against the outer circumferential surface 124 of the downlight trim so that the downlight trim flexes inward towards the light guide plate 108 until the outer circumferential surface 124 is able to pass through the narrower opening of the circular rear facing opening 118 of the light cover 100. Then, the downlight trim 102 will snap back into its unstressed shape and be trapped in the curved inner surface 122 which extends around the interior of the light cover 100.

To remove the light cover 100 from the downlight trim 102, the light cover is pulled away from the downlight trim so that the downlight trim flexes outward away from the light guide plate 108 until the outer surface 124 is able to pass through the narrower opening of the circular rear facing opening 118 and the light cover can be pulled away from the downlight trim.

The light cover is constructed of a somewhat flexible material selected from the group comprising polycarbonate and plastic.

The present invention has been described in detail above with reference to the embodiments of the drawings, and various modifications of the present invention can be made by those skilled in the art in light of the above description. Any modification within the spirit and principle of the present invention, made, equivalent substitutions, improvements, etc., should be included within the scope of the present invention. Thus, certain details of the embodiments should not be construed as limiting the present invention, the present invention will define the scope of the claims appended as the scope of the present invention.

The invention claimed is:

1. A downlight trim installed on a ceiling, comprising:
an opening;
a trim flange having an outer diameter;
a light guide plate mounted to the downlight trim and comprising a diffusion plate, wherein the diffusion plate of the light guide plate extends through the opening of the downlight trim;
wherein the trim flange of the downlight trim is disposed against the ceiling and projects outward and away from the light guide plate such that the diffusion plate of the light guide plate extends downward from the downlight trim through the opening and away from the ceiling;
a light cover mounted to the trim flange of the downlight trim and projecting downward from the ceiling;
wherein the light cover comprises:
a circular rear facing opening therethrough through which the diffusion plate of the light guide plate extends so as to light up the light cover when light is emitted into the light guide plate,
a collar disposed on a rear facing side of the light cover and that extends from the rear facing side toward the downlight trim, and
a curved inner surface that extends around the interior of the light cover between the collar and the circular rear facing opening such that the collar and the curved inner surface define the circular rear facing opening and wherein the curved inner surface of the collar defines an inner diameter of the collar; and
wherein the inner diameter of the collar of the light cover is slightly smaller than the outer diameter of the trim flange of the downlight trim whereby the light cover is mounted to the downlight trim by pressing the circular rear facing opening of the light cover against the trim flange of the downlight trim, and
wherein the trim flange of the downlight trim is configured to flex inward such that an interference fit between the collar of the light cover and the trim flange of the downlight trim is provided such that the downlight trim is trapped in the curved inner surface of the light cover when the downlight trim snaps back into its unstressed shape.

2. The light cover of claim 1 wherein the downlight trim is constructed of a somewhat flexible material that holds its shape selected from the group comprising plastic and polycarbonate.

3. The light cover of claim 1 wherein the light cover is mounted to the downlight trim so that the downlight trim flexes inward towards the light guide plate until the outer circumferential surface is able to pass through the narrower opening of the circular rear facing opening.

4. The light cover of claim 3 wherein the downlight trim will be gripped between the circular rear facing opening and the curved inner surface which extends around the interior of the light cover.

5. The light cover of claim 4 wherein the light cover is removed from the downlight trim when the light cover is pulled away from the downlight trim so that the downlight trim flexes outward away from the light guide plate.

6. The light cover of claim 5 wherein the light cover is removed from the downlight trim when the trim flange is able to pass through the narrower opening of the circular rear facing opening and the light cover can be pulled away from the downlight trim.

7. A downlight trim installed on a ceiling, comprising:
an opening;
a trim flange configured to flex and having an outer diameter;
a light guide plate mounted to the downlight trim and comprising a diffusion plate, wherein the diffusion plate of the light guide plate extends through the opening;
wherein the trim flange of the downlight trim projects outward and away from the light guide plate along the ceiling such that a diffusion plate of the light guide plate extends downward from the downlight trim and away from the ceiling;
a light cover mounted to the downlight trim;
the light cover comprising:
a circular opening therethrough through which the diffusion plate of the light guide plate extends so as to light up the light cover when light is emitted into the light guide plate,
a collar disposed on a rear facing side of the light cover and that defines the circular rear facing opening and that extends from the rear facing side of the light cover toward the downlight trim, and
a curved inner surface that extends around the interior of the collar of the light cover between the collar and the circular rear facing opening, wherein the curved inner surface defines an inner diameter of the collar; and
wherein the inner diameter of the collar has a slightly smaller diameter than the outer diameter of the trim flange of the downlight trim whereby the light cover is mounted to the downlight trim by pressing the circular rear facing opening of the light cover against the trim flange of the downlight trim such that an interference fit is provided as the trim flange of the downlight flexes against the curved inner surface of the light cover.

8. The light cover of claim 7 wherein the downlight trim is constructed of a somewhat flexible material that holds it shape selected from the group comprising plastic and polycarbonate.

9. The light cover of claim 8 wherein the light cover is mounted to the downlight trim by an interference fit between the light cover and the trim flange of the downlight trim.

10. The light cover of claim 9 wherein the downlight trim will be gripped in the curved inner surface which extends around the interior of the light cover.

11. The light cover of claim 10 wherein the light cover is removed from the downlight trim when the trim flange is able to pass through the narrower opening of the circular rear facing opening and the light cover can be pulled away from the downlight trim.

12. The light cover of claim 7 whereby the flexing of the downlight trim inward caused by an interference fit between the light cover and the trim flange of the downlight trim causes the downlight trim to be trapped in the curved inner surface which extends around the interior of the light cover when the downlight trim snaps back into its unstressed shape.

* * * * *